US011328325B2

(12) United States Patent
Trinh et al.

(10) Patent No.: US 11,328,325 B2
(45) Date of Patent: May 10, 2022

(54) METHOD AND/OR SYSTEM FOR USER AUTHENTICATION WITH TARGETED ELECTRONIC ADVERTISING CONTENT THROUGH PERSONAL COMMUNICATION DEVICES

(75) Inventors: John Trinh, Orange, CA (US); Miguel Medina, Walnut, CA (US)

(73) Assignee: SecureAds, Inc.

( * ) Notice: Subject to any disclaimer, the term of this patent is extended or adjusted under 35 U.S.C. 154(b) by 0 days.

(21) Appl. No.: 13/429,070

(22) Filed: Mar. 23, 2012

(65) Prior Publication Data
US 2013/0254036 A1 Sep. 26, 2013

(51) Int. Cl.
*G06Q 30/02* (2012.01)
*H04L 29/06* (2006.01)

(52) U.S. Cl.
CPC ..... *G06Q 30/0267* (2013.01); *G06Q 30/0251* (2013.01); *G06Q 30/0269* (2013.01); *H04L 63/0838* (2013.01); *H04L 63/18* (2013.01)

(58) Field of Classification Search
USPC .......................................................... 705/14
See application file for complete search history.

(56) References Cited

U.S. PATENT DOCUMENTS

| | | | |
|---|---|---|---|
| 5,933,811 | A | 8/1999 | Angles et al. |
| 6,993,658 | B1 | 1/2006 | Engberg et al. |
| 7,023,995 | B2 | 4/2006 | Olsson |
| 8,175,624 | B2 | 5/2012 | Philbin et al. |
| 2001/0007097 | A1* | 7/2001 | Kim ........................ G06Q 30/02 705/14.19 |
| 2007/0083433 | A1* | 4/2007 | Lawe ............................... 705/14 |
| 2007/0113294 | A1 | 5/2007 | Field et al. |
| 2007/0179842 | A1 | 8/2007 | Chen |
| 2008/0126145 | A1 | 5/2008 | Rackley, III et al. |
| 2009/0063274 | A1* | 3/2009 | Dublin et al. ................... 705/14 |
| 2009/0124241 | A1* | 5/2009 | Krishnaswamy ...... G06Q 30/02 455/414.2 |
| 2009/0187759 | A1* | 7/2009 | Marsico .............. H04L 63/0428 713/155 |
| 2009/0327140 | A1 | 12/2009 | Kuo |
| 2010/0115060 | A1 | 5/2010 | Julia et al. |
| 2011/0029436 | A1* | 2/2011 | Norvell .................... G06F 21/31 705/67 |

(Continued)

FOREIGN PATENT DOCUMENTS

| | | |
|---|---|---|
| AU | 2013234894 | 1/2015 |
| CA | 2868242 | 9/2014 |

(Continued)

OTHER PUBLICATIONS

D. DeFigueiredo, "The Case for Mobile Two-Factor Authentication," in IEEE Security & Privacy, vol. 9, No. 5, pp. 81-85, Sep.-Oct. 2011, doi: 10.1109/MSP.2011.144. (Year: 2011).*

(Continued)

*Primary Examiner* — George Chen
*Assistant Examiner* — Rodney M Henry

(57) ABSTRACT

An apparatus and method is provided for generating a request for a one-time password (OTP), and with the OTP transmitted to a mobile device in an electronic message that includes the OTP in conjunction with an electronic advertising content that is targeted to the user of the mobile device.

13 Claims, 5 Drawing Sheets

PERSONAL COMMUNICATION DEVICE
700

(56) References Cited

U.S. PATENT DOCUMENTS

| | | | | |
|---|---|---|---|---|
| 2011/0035280 | A1* | 2/2011 | Fordyce, III | G06Q 20/10 705/14.53 |
| 2012/0116887 | A1* | 5/2012 | Norair | 705/14.64 |
| 2012/0221421 | A1* | 8/2012 | Hammad | G06Q 10/00 705/16 |
| 2012/0271712 | A1* | 10/2012 | Katzin | G06Q 30/06 705/14.51 |
| 2012/0284107 | A1* | 11/2012 | Gernaat | G06Q 20/387 705/14.26 |
| 2012/0311083 | A1* | 12/2012 | Julia et al. | 709/217 |
| 2013/0144696 | A1* | 6/2013 | Raisch | G06Q 30/02 705/14.16 |

FOREIGN PATENT DOCUMENTS

| | | |
|---|---|---|
| CN | 102165475 A | 8/2011 |
| EP | 2829036 | 1/2015 |
| HK | 1204170 | 6/2015 |
| JP | 2001-306520 A | 11/2001 |
| JP | 6149319 | 5/2017 |
| KR | 2008-0043949 A | 5/2008 |
| KR | 2009-0120475 A | 11/2009 |
| MX | 346056 | 9/2014 |
| VN | 17269 | 3/2013 |
| WO | WO 2008/098004 A2 | 8/2008 |

OTHER PUBLICATIONS

First Examination Report; NZ Application No. 700624, dated Dec. 17, 2015.
International Search Report; Int'l Application No. PCT/US2013/033613, dated Jun. 5, 2013.
Patent Examination Report No. 1; AU Application No. 2013234894, dated Apr. 23, 2015.
Office Action, Application No. 2015.503425, dated Dec. 25, 2015.
Examiner's Report, Application No. 2,868,242, dated Nov. 6, 2015.
Second [Further] Examination Report; NZ Application No. 700624, dated Jul. 21, 2015.
AT&T Knowledge Ventures v. Comptroller General of Patents (2009) Neutral Citation No. EWHC 343 (Pat) In the High Court of Justice, Chancery Division, Patents Court; Royal Courts of Justice, Strand, London, WC2 2LL [Mar. 3, 2009].
New Zealand First Examination Report, New Zealand Application No. 715208, dated Jul. 25, 2016.
Korean Provisional Rejection, Korean Application No. 10-2014-7029407, dated Jul. 28, 2016.
Mexican Office Action, Mexican Application No. MX/a/2014/011344, dated Nov. 7, 2016.
Canadian Examination Report, Canadian Application No. 2,868,242, dated Nov. 16, 2016.
New Zealand Further Examination Report, New Zealand Application No. 715208, dated Nov. 28, 2016.
Communication pursuant to Article 94(3) EPC; European Application No. 13716105.5, dated Dec. 5, 2016.
Office Action, Korean Application No. 10-2014-7029407, dated Mar. 2, 2017.
New Zealand Further Examination Report, New Zealand Application No. 715208, dated Apr. 20, 2017.
Korean Office Action; Korean Patent Application No. 10-2014-7029407, dated Jun. 22, 2017.
Chinese First Office Action, Chinese Application No. 201380026872.9, dated Sep. 1, 2016.
The Second Office Action, Chinese Application No. 201380026872.9, dated Jun. 15, 2017.
Examiner's Report, Canadian Application No. 2,868,242, dated Sep. 22, 2017.

* cited by examiner

METHOD AND/OR SYSTEM FOR USER AUTHENTICATION WITH TARGETED ELECTRONIC ADVERTISING CONTENT THROUGH PERSONAL COMMUNICATION DEVICES

BACKGROUND OF THE INVENTION

1. Field of the Invention

The present invention relates to a method and/or system for delivery of electronic advertising content in conjunction with one-time password (OTP) delivery over a wireless and/or cellular network to personal communication devices and/or computing platforms.

2. Description of the Prior Art

With the growth of the Internet and the availability of online products and/or services, electronic forms of advertising are becoming more important. Likewise, advertisers as well as merchants are looking for new and better ways to focus advertising directly to consumers using a delivery platform that increases advertisements view rate based on the relevance of a consumer's interests and/or needs. Similarly, more and more personal communication devices, such as mobile and/or wireless handheld devices, for example, are being used for communications, such as web surfing, email correspondence and/or electronic messaging, among other examples. Therefore, in addition to a desire to be able to attract and/or better target electronic advertising content in general, there is also a desire to have the ability to target and/or customize electronic advertising content to such devices in particular.

SUMMARY OF THE DISCLOSURE

It is an object of the present invention to provide a mechanism and/or an approach so that electronic advertising content can be directed to those consumers who are more likely to benefit from receiving a particular electronic advertising content, and also to have a mechanism and/or an approach so that such electronic advertising content are more likely to be viewed.

In order to accomplish the objects of the present invention, the authentication advertising system of the present invention provides a method that generates a request for a one-time password (OTP) from a limited access system, with the method transmitting to a personal communication device an OTP in conjunction with electronic advertising content. In accordance with another embodiment, the present invention provides a method that transmits a request for an OTP from a personal communication device, with the method transmitting an OTP in conjunction with electronic advertising content to the personal communication device that transmitted the request. Electronic advertising content message may also be sent to a limited access system used to initiate the OTP request and access the online account.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Some portions of this disclosure are presented in terms of algorithms and/or symbolic representations of operations on data bits and/or binary digital signals stored within a computing system, such as within a network, cloud, computer and/or computing system memory. These algorithmic descriptions and/or representations are the techniques used by those of ordinary skill in the data processing arts to convey the substance of their work to others skilled in the art. As used herein, an algorithm is considered to be a self-consistent sequence of operations and/or similar processing leading to a desired result. The operations and/or processing may involve physical manipulations of physical quantities. Typically, although not necessarily, these quantities may take the form of electrical and/or magnetic signals capable of being stored, transmitted, transferred, combined, compared and/or otherwise manipulated. It has proven convenient, at times, principally for reasons of common usage, to refer to these signals as bits, data, values, elements, symbols, characters terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification, discussions utilizing terms such as "processing", "computing", "cloud computing", "calculating", "determining", "profiling", and/or the like refer to the actions and/or processes of a computing platform, such as a computer and/or a similar electronic computing device, that manipulates and/or transforms data represented as physical electronic and/or magnetic quantities and/or other physical quantities within the computing platform's processors, memories, registers, and/or other information storage, transmission, and/or display devices.

As previously alluded to, the growth in the Internet (in the use of email and in the use of personal communication devices, including but not limited to mobile and wireless handheld devices) has led to a desire for more focused and/or targeted electronic advertising content. In general, consumers are bombarded with spam, emails, messages, banner ads and the like that have made advertising to personal communication devices ineffective. Therefore, it would be desirable to have a mechanism and/or an approach so that electronic advertising content could be directed to those consumers who are more likely to view and benefit from a particular electronic advertising message over another.

By way of background, personal communication devices include, without limitation, wireless handheld devices, smartphones, personal digital assistants (PDAs), cell phones, feature phones, hybrid phones, tablets, pagers, and/or other mobile devices. It is common for such devices to employ a common set of reasonably well established messaging and/or communications protocols or formats, including, for example, SMS ("short message service"), SMPP ("short message peer-to-peer"), MMS ("multimedia messaging service") pictures, QR Codes ("quick response"), coupons/tickets, OTA (Over-the-Air) notifications and/or updates, Click-to-Call hyperlinks, hyperlinks, image embedded hyperlinks, re-direct to web for video, push notification text and/or images, SMIL ("synchronized multimedia integration language"), social marketing engines such as "TWITTER"™ and in addition to others that are currently being developed or that may be developed in the future, USSD ("unstructured supplementary service data") to send and/or a variety of types of content, including text, images, audio, video and/or other types of data. Personal communication devices, of course, provide an attractive mechanism for distributing information, including electronic advertising content, particularly if the user is mobile and/or otherwise remote from a wired line connection, for example.

However, while personal communication devices are frequently the object of electronic advertising content and/or other targeted information, users of those devices often may not "open" the message and/or otherwise experience the electronic advertising content being sent, whether as text, audio, imaging and/or video. Thus, advertisers and/or merchants may have difficulty delivering targeted electronic advertising content effectively because, with mass advertising and/or mass media, they are having difficulty specifically targeting those users who may find the electronic advertising content appealing and/or relevant.

In this context, it is useful to clarify some terminology. For example, as used herein, OTP refers to a secret word, string of characters, personal identification number (PIN), and/or password that is used for authentication which is valid for a limited amount of time for only one login session and/or transaction and is used to validate identity and/or allow access to a particular resource. Thus, an OTP would be valid for a short period of time, such as one minute. Likewise, the term "personal communication device" and "wireless handheld device" are used interchangeably to refer to any mobile and/or handheld device capable of receiving content, such as text, audio, images and/or video, in the form of an electronic signal. In addition to a smart phone, a "personal communication device" may also include a computer and/or computing platform, such as a laptop, tablet, personal computer and/or workstation having wireless capability connected to the internet and/or an Intranet. Such devices are usually capable of transmitting content in various forms, although this is not necessarily the case. As used herein, "electronic advertising content" and "electronic advertising message" are used interchangeably to refer to a method of exchanging targeted and/or non-targeted digital information including but not limited to messages, notifications, resources, and/or other forms of advertisements across the internet, intranet, and/or other computing platforms. Electronic advertising content may use consumer profile information such as, for example, a website a consumer visits, the pages visited, the amount of time on each page, the links that were clicked on, the searches that were made, the demographics, the geography, consumer provided information, and/or a culmination of the like, to identify and target those consumers and/or users that are more likely to be receptive to a particular electronic advertising message. This process is meant to accurately interpret and classify each user based on a profile. For example, if a user is known to frequently visit a number of stock brokerage website based on the Information analyzed, that user can then be served annuity related ads when they visit non-stock brokerage related website(s). Similarly, "targeted and/or customized electronic advertising message" refers to modifying and/or developing the electronic advertising message, again, using a variety of information sources, such as device unique identifiers, demographics, geography, consumer profile information and/or the culmination of the like, so that the electronic advertising message will be received more receptively by consumers to which it is tailored than by those to whom it is not tailored. As is well-known, "SMS" refers to a short message service. SMS messages is a two-way wireless alphanumeric text messaging service that enables short text messages to be communicated electronically. In Code Division Multiple Access (COMA) systems and/or Global System for Mobile Communications (GSM), SMS messages may in general comply with, or be compatible with, a variety of features, such as, for example, the description of features provided by TIA/EIA-637-A, published September 1999, Telecommunications Industry Association www.tiaonline.org and other related specifications, available, for example, from ANSI (American National Standards Institute). Smart phones are one example of the myriad of personal communication devices that are available which can support SMS messaging, typically include the ability to send and receive SMS messages in the form of text, hyperlinks, picture messages, and/or any combination thereof. Likewise, SMS messages may be stored and/or forwarded at SMS message centers for later retrieval if the associated personal communication device is not immediately available. Although the claimed subject matter is not limited in scope to SMS messages, it is further noted that such electronic advertising content can travel via a wireless communication system's control channel and/or data channel, in contrast to the voice channel for a mobile phone, for example. "Multimedia Messaging Service" (MMS) is another type of well-known messaging service. An MMS message is a messaging service similar to SMS messages. For example, an MMS message may include text, a picture, a video, an audio object, and/or any combination thereof. Thus, MMS message is a type of messaging that extends SMS messages. In addition to the familiar text content of text messages, MMS messages may comprise text, images, images with hyperlinks, graphics, graphics with hyperlinks, voice, video, and/or audio clips, and the like.

It is noted that the use of OTPs is expected to increase as various industries, such as the banking industry, the healthcare industry, and education, promulgate various regulations regarding improved security for user authentication and online access to personal accounts. For example, the Federal Financial Institutions Examination Council (FFIEC) considers single-factor authentication to be inadequate for transactions involving access to customer information. In 2005, the FFIEC issued "Authentication in an Internet Banking Environment," which mandates financial institutions engaging in any form of Internet banking has effective and reliable methods to authenticate customers. One methodology identified by the FFIEC includes the use of OTPs. Likewise, Congress enacted the Health Insurance Portability and Accountability Act (HIPAA) in 1996, which affects the healthcare industry. Covered healthcare entities are expected to ensure the confidentiality, integrity, and availability of all electronically protected health information that the covered entity creates, receives, maintains, transfers and/or transmits. Again, the use of two-factor authentication, such as OTP delivery, may be employed to reduce the risk of unauthorized "remote" access to electronic health records. Likewise, in the education field, the federal Family Educational Rights and Privacy Act (FERPA) protects the privacy of student education records and applies to all schools that receive federal funding under an applicable program of the U.S. Department of Education. To comply with this statute, educational institutions may employ OTP delivery to ensure secure online access for administrators and/or students to educational records. As described in more detail below, embodiments of a method and/or system in accordance with the present invention may employ a technique involving the use of an OTP in conjunction with providing targeted and/or customized electronic advertising content to the end user and/or consumer.

Figure 1:
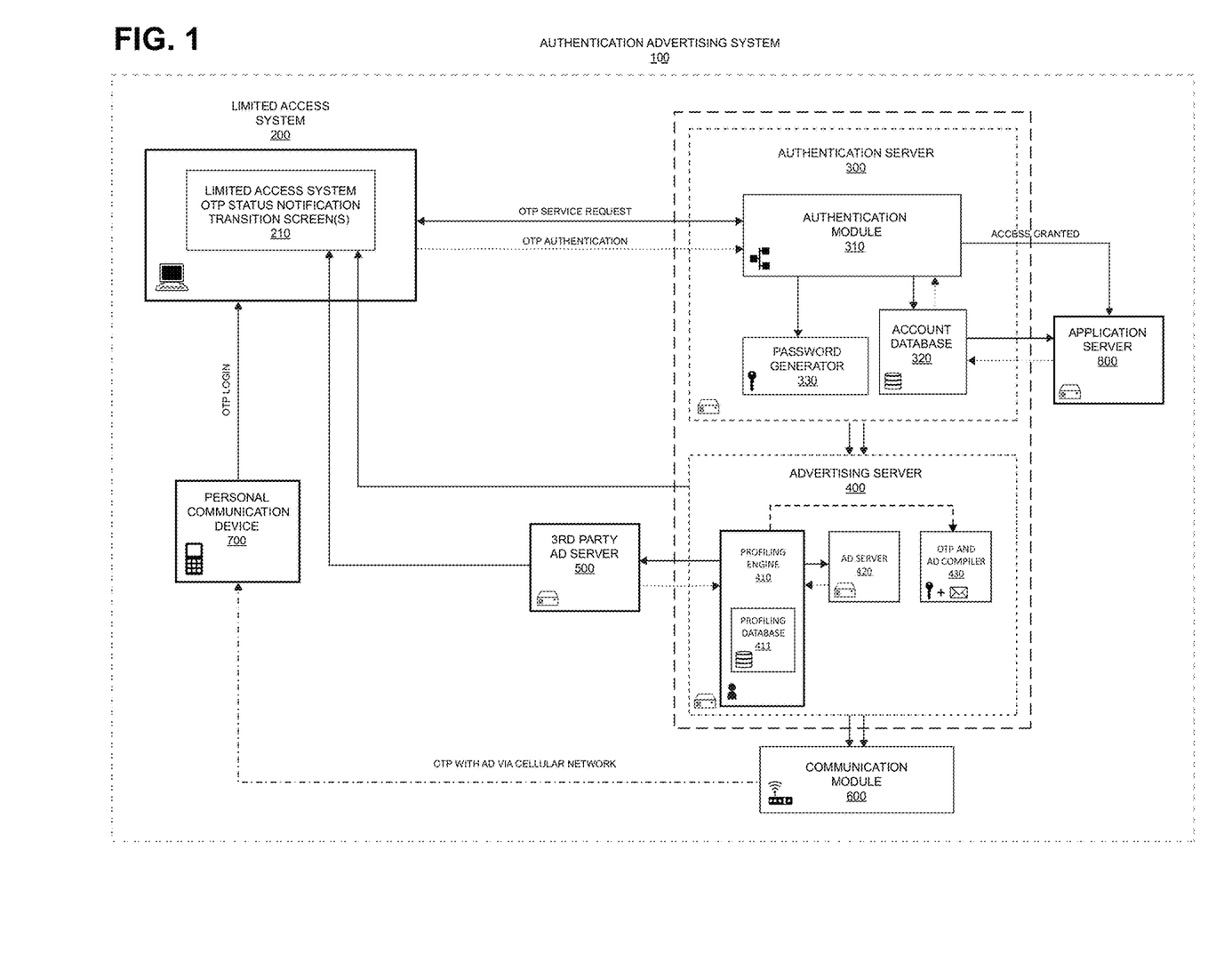
FIG. 1 is a block diagram illustrating an embodiment of an authentication advertising system for electronic advertising content according to the present invention.

FIG. 1 is a block diagram illustrating one non-limiting embodiment of an authentication advertising system 100 for generating targeted electronic advertising content in conjunction with an OTP delivery. The authentication advertising system 100 includes a personal communication device 700 (e.g., a wireless handheld device), a user authentication server 300, a limited access system and/or computing platform 200 to which authentication server 300 may regulate access, and an advertising server 400. The personal communication device 700 is configured to communicate over a wireless and/or cellular network with the authentication server 300 which may regulate access, and the advertising server 400. The advertising server 400 may further include a profiling engine 410, a profiling database 411, ad server 420 and an OTP and ad compiler 430, as described in greater detail below. A communication module 600 is prompted by the authentication server 300 in which the communication module 600 is configured to transmit the OTP and/or token in conjunction with an electronic advertisement message from the advertising server 400 to the personal communication device 700 through the wireless and/or cellular network, and an authentication module 310. The authentication server 300 is configured to validate the OTP from the user through the limited access system 200, with the limited access system 200 being different from the wireless and/or cellular network.

The user authentication server 300 preferably includes a program and/or a suite of programs running on a computer system to perform user authentication services. The user authentication server 300 may also include the computer system and hardware upon which the programs run. The authentication server 300 can be located within a user's network environment and/or be located offsite as a hosted solution by a third party vendor. The user authentication server 300 is preferably configured to require that the user supply the OTP received through the secure personal communication device 700 in order to gain access to an online application and/or application server 800 through the limited access secure system and/or computing platform 200.

In one embodiment, the personal communication device 700 may comprise, for example, a smart phone or wireless handheld device with capability to send and receive text, hyperlinks, images, audio, video, push notifications, OTA (Over-the-Air) notifications and/or updates, QR (quick response) codes, and/or other content. In one non-limiting example, the personal communication device 700 supports SMS messages. It should be understood that SMS messages is merely an example, and other technologies, services and/or protocols now known, such as multimedia messaging service (MMS), or push notification text/images, or OTA notifications and/or updates, or synchronized multimedia integration language (SMIL), and/or technologies to be developed in the future, are intended to be capable of being supported by the personal communication device 700.

The desired and/or selected limited access system 200 may comprise any system and/or platform, including a computing platform with an operating system, or personal computer, or enterprise workstation, or tablet, or a web server, or website, or an online account, and/or any other protected area that stores electronic information and may be accessed via a peripheral of some type. In a non-limiting example, the desired and/or selected limited access system 200 may comprise an account on a computing platform capable of being accessed via a local area network, and/or an account on the Internet capable of being accessed via a web browser. Continuing with this particular example, the limited access system 200 may request an OTP from the authentication server 300 to gain access to application server 800 and/or an online account via the limited access system 200. A request may seek more than an OTP. For example, as described in more detail below, a device may include other requests together with a request for an OTP. For example in FIG. 5, it may be desirable to obtain electronic advertising content (e.g., incentives for opening a new savings account) that is delivered via an OTP status notification transition screen(s) 210 to the desired and/or limited access system 200. Therefore, it may also be possible to receive electronic advertising content in conjunction with the OTP via personal communication device 700 that provides access to an online account via the desired and/or selected limited access system 200 and also provide advertisement(s) when the OTP request is initiated in the OTP status notification transition screen(s) 210. This advertisement on the OTP status notification transition screen(s) 210 may be transmitted from advertising server 400 and/or $3^{rd}$ party ad server 500 in the form of banner ads, floating ads, expanding ads, wallpaper ads, pop-up, pop-under, roll-over, audio ads, QR codes, video ads, map ads, hyperlinks, social media feeds, new tab, new window session, live tickers and/or feeds, and/or widgets, and all other means of displaying electronic advertising content that may be supported and/or developed in the future.

As described above, the authentication server 300 may include a program and/or suite of programs running on a computer and/or other computing platform to perform authentication services. In one embodiment, the authentication server 300 may be integrated into the desired and/or selected limited access system 200. For example, the authentication server 300 may grant access to application server 800 and/or an online account via the desired and/or limited access system 200 if correct data is provided, such as inputting a one-time PIN and/or OTP received from personal communication device 700.

The present invention is not limited in scope to a particular form of a password, regardless of whether or not the password comprises an OTP. As a non-limiting example, the authentication Information may include but is not limited to, an account ID, user ID, a PIN, and/or an OTP. In such an embodiment, a user ID may or may not be publicly known. For example, the user ID may comprise a user name, user email, and/or company's name and/or some form thereof. Likewise, the PIN, passcode, and/or password may be secret and known only to one or a few individuals who are properly authorized to access information on application server 800 and/or an online account via the desired and/or selected limited access system 200. In one embodiment, therefore, a user desiring access to the information available in application server 800 via the desired and/or selected limited access system 200, and who is authorized to access such information, may enter both the user ID and/or PIN to initiate the OTP request. Upon inputting the OTP received via personal communication device 700, the user will be authenticated and granted access to the online account, application, and/or application server 800.

In one such embodiment, for example, a personal communication device 700 may initiate a request for an OTP. The request may be made via an SMS message, although this is not limited to employing SMS messages. One advantage of SMS messages is that it is relatively quick to send and/or receive messages via this particular type of electronic message service. A reason this may provide an advantage is that, as previously indicated, an OTP is only valid for a limited period of time. In general, the shorter the period of validity, the more secure the system since it would provide an interloper or an unauthorized person with less time to attempt to guess and/or intercept the OTP. Therefore, when employing OTPs of relatively short durations, such as 60 seconds, it is desirable to have the capability to transmit the OTP in a manner that ordinary transmission delays associated with transmitting the electronic advertising content with the OTP from the server to the device do not significantly degrade the security layers provided by the OTP. Additionally, having a high percentage of follow-up requests for an OTP because the OTP received had expired before it was received will negatively impact the overall user experience.

As previously indicated, most personal communication devices 700 support electronic messaging via SMS messages. This is another advantage associated with SMS messages as a transmission mechanism. Nonetheless, having a mechanism that permits OTPs to be received before they expire is one advantage, as suggested above. In addition, a personal communication device 700 provides convenience to the user seeking access to an application server 800 and/or online account via the desired and/or selected limited access system 200. Typically, most individuals carry their wireless handheld device with them. Likewise, personal communication devices 700 are usually not shared. Therefore, this provides an additional layer of security along with added convenience. Furthermore, the authentication server 300 may only recognize and respond to a limited set of authorized personal communication devices 700, if that is desired. Thus, because a user seeking access via the desired and/or selected limited access system 200 would transmit the request for an OTP from an authorized personal communication device 700, even assuming a user ID and PIN are compromised, a malicious party still would be unable to access an application server 800 and/or online account via the desired and/or limited access system 200 without also having access to the personal communication device 700. As used in this paragraph (and elsewhere in this disclosure), even though the personal communication device 700 is described as being "wireless handheld device", this is not necessary as the personal communication device 700 can also be a computing device that is located in a fixed location, such as a desktop computer, kiosk, laptop, tablet, and/or other computing platforms.

In one embodiment, for example, the personal communication device 700 may initiate a request for an OTP. After receiving a request for an OTP from a wireless handheld device authorized to make such requests, the authentication server 300 may, for example, authenticate the request for an OTP.

In the embodiment of FIG. 1, the communication module 600 can also be part of the authentication server 300. The communication module 600 may provide electronic messaging send and/or receive capabilities, such as for SMS messaging, MMS messaging and/or push notifications, for example. Accordingly, the authentication server 300 may receive an SMS message from the personal communication device 700. The communication module 600 is prompted by the authentication server 300 to send an OTP, after authentication module 310 and account database 320 verify that the personal communication device 700 is authorized to request and/or receive the OTP. The authentication server 300 may also include a password generator 330 that is capable of generating an OTP. The OTP can be generated in any known manner. For example, a random number and/or character generator, pseudo-random number and/or character generator, random number and/or character generator based upon time release, and/or any combination thereof may be employed.

An OTP may be desirable to make it more difficult to gain unauthorized access a restricted network resource, such as application server 800 and/or an online account via the desired and/or selected limited access system 200. Systems and/or online accounts using static PINs and/or passwords that do not change frequently enough are more susceptible to be accessed by an unauthorized user. By employing an OTP that remains valid for a limited period of time, these risks associated with static passwords may be drastically reduced and/or even eliminated. Thus, if the authentication module 310 is able to verify that the request for an OTP came from an authorized personal communication device 700, then eventually, the authentication server 300 will transmit an OTP to the requesting authorized personal communication device 700. For example, an OTP may be transmitted to the personal communication device 700 via an SMS message. In addition, if the authentication server 300 verifies that the request was sent from an authorized personal communication device 700 for the particular account, based on the information in the account database 320, then an OTP will be delivered in conjunction with electronic advertising content to the personal communication device 700. In addition, desired and/or selected limited access system 200 may receive electronic advertising content via an OTP status notification transition screen(s) 210, as explained in more detail below. Therefore, it is expected that a user of the personal communication device 700 will receive the OTP with electronic advertising content and use the OTP to gain access to an online account and/or application server 800 via the desired and/or limited access system 200 before the OTP expires.

For example, a user of personal communication device 700 having received a valid OTP may enter the OTP, in an attempt to gain access to an online account and/or application server 800 via the desired and/or selected limited access system 200. After the user enters a valid OTP, received via personal communication device 700 in the form of an SMS message, the limited access system 200 may request that the authentication server 300 validate the OTP entered by the user. If the user enters a valid OTP that has not expired, the authentication module 310 should respond to an authentication request from the limited access system 200 by supplying an authentication confirmation. As a result of receiving such a confirmation, the limited access system 200 should allow access to the online account and/or application server 800 to the user, as desired.

As part of the authentication process, the account database 320 may be accessed by the authentication module 310. The account database 320 may comprise of any database, such as one that includes user IDs, PINs, and/or other account related information to further validate the user identity in order to generate an OTP. The account database 320 may also include demographic information related to the individuals and/or entities having accounts. For example, information such as gender, age, geographic region of interest, industry, frequency of access, time and/or location at time of access, and the like, may be tracked and stored for later use. This additional information may be employed, along with other sources of information, to provide a targeted and/or customized electronic advertising content along with the OTP to be transmitted to the personal communication device 700. Additionally, a separate electronic advertising content may be sent to the OTP status notification transition screen(s) 210 on limited access system 200.

For example, the authentication server 300 may transmit the OTP in conjunction with electronic advertising content that may be targeted and/or customized to the individual and/or entity associated with the account, and therefore, the particular personal communication device 700 and OTP status notification transition screen(s) 210 may display the electronic advertising content selected. This information may be transmitted from the communications module 600 to personal communication device 700 in the form of an SMS message. MMS message, or advertising push notification, although other means of transmission are also possible.

Although the present invention is not limited in scope to any particular process for targeting and/or customizing the electronic advertising content to be delivered, in one embodiment, information may be selected using the advertising server 400, which may include a program and/or suite of programs running on a computer or other computing platform such as profiling engine 410, profiling database 411, and ad server 420. The profiling engine 410 may access information available from sources external to authentication server 300 or internal such as profiling database 411. For example, the profiling engine 410 may access or direct a request for information to a profiling database 411, which may be located in the advertising server 400, or on another server, such as server $3^{rd}$ party ad server 500. The e party ad server 500 may be owned and/or otherwise supported by a third-party online marketing organization or an online merchant. As another example, the profiling engine 410 may provide information obtained from the account database 320 to the profiling database 411. For example, an online third-party marketing organization that tracks online purchases may have information regarding previous online purchases associated with this particular user and/or account.

As yet another example, the desired and/or selected limited access system 200 may comprise online access to an asset account, such as one maintained by a bank and/or by a brokerage organization. In such a situation, the account database 320 may have information regarding debit and/or credit card purchases and other information. Likewise, a smart phone may be associated with this information via the personal communication device 700 and/or the information provider by service provider for personal communication device 700 such as but not limited to International Mobile Subscriber Identity (IMSI), International Mobile Equipment Identity (IMEI), Media Access Control address (MAC address), and/or Mobile Equipment Identifier (MEID). Finally; through the set of SMS messages and/or push notification electronic messaging, and/or a similar form of packetized communication via the web, a TCP/IP address may also be associated with this other information. In this manner, sufficient information may be available from these sources for an advertising server 400, with such information contained in a profiling database 411 for a targeted and/or customized electronic advertising content to be decided upon for delivery to a personal communication device 700 in conjunction with an OTP. In addition, an electronic advertising message can alto be sent to the OTP status notification transition screen(s) 210 at the same time the OTP with electronic advertising content Is being delivered to the personal communication device 700. Such targeted and/or customized electronic advertising content can be delivered to the OTP status notification transitions screen(s) 210 in the form of banner ads, floating ads, expanding ads, wallpaper ads, pop-up, pop-under, roll-over, audio ads, QR codes, video ads, map ads, hyperlinks, social media feeds, new tab, new window session, live tickers and/or feeds, widgets, and all other means of displaying electronic advertising content that may be supported and/or developed in the future. In the embodiment of FIG. 1, information provided to the profiling engine 410 can be provided by a $3^{rd}$ party ad server 500 to the advertising server 400. However, in an alternate embodiment, the profiling engine 410 may also receive demographic information maintained in the account database 320 from the authentication server 300, and a targeted and/or customized electronic advertising content may be selected and/or generated without resorting to information external to advertising server 400. However, in embodiments in which the $3^{rd}$ party ad server 500 is external to the advertising server 400, profiling engine 410 may, for example, evaluate information from the account database 320 in conjunction with other available data that may be provided by the profiling database 411. In either case, based on the Information available at the time, a more relevant or more attractive electronic advertising message for the user may be provided to the personal communication device 700 and the desired and/or selected limited access system 200 via an OTP status notification transition screen(s) 210. Thus, the profiling engine 410, for example, in conjunction with profiling database 411, may result in more relevant information being delivered to the personal communication device 700 and the OTP status notification transition screen (s) 210 based on the profile of the personal communication device 700 user that corresponds with user profile stored on profiling database 411. In other words, the profiling engine 410 nearly seamlessly integrates with profiling database 411 and/or account database 320 as a method of cross referencing several sources of user profile information so advertising server 400 can process and select a targeted and a more effective electronic advertising message for delivery to the desired and/or selected end user. This embodiment may result in the integration of databases that traditionally have not been integrated. For example, information may be gleaned from a unique phone identifier such as the ones mention hereinabove and/or it may be from information collected through for credit and/or debit card information, purchasing history, and/or web browsing habits etc.

By providing a targeted and/or customized electronic advertising message that relates at least in part to the request for an OTP that was made from the desired and/or selected limited access system 200 and/or personal communication device 700, it is expected that the electronic advertising message containing the OTP will be viewed by the user a higher percentage of the time. Since a request was made for an OTP, it is expected that once provided, the OTP will be used. Likewise, to obtain the OTP, a user will read the electronic message containing the OTP, including the targeted and/or customized electronic advertising content that was also transmitted in the same electronic message.

In addition, since the profiling engine 410 provides a mechanism to obtain information from sources external to the advertising server 400, the present invention opens up a host of various possibilities and alternate embodiments. In one example, the desired and/or selected limited access system 200 can comprise a network to be accessed by the user of the personal communication device 700 for web browsing and/or online account access. Once access is granted to the network via a validated OTP, a particular user's browsing activities may be tracked, such as what advertisements and/or other content the particular user may view and/or click. This clickthrough rate (CTR) is a measuring of the success of an online advertising campaign. Because the user's behavior patterns is now available, the data collected can be utilized to adjust the electronic advertising content to create a higher probability that the user will respond to a particular offer when delivering electronic advertising message in conjunction with an OTP. As a result, in those situations in which advertisers are compensated based at least in part on consumer "response rate," "CTR," and/or "pay per reply" behavior, it is expected that advertising revenue should increase from this type of targeted and/or customized electronic advertising delivery method.

As another example, targeted and/or customized electronic advertising content delivered with an OTP may include, without limitation, product or service discounts, and opportunities for access to special events, electronic coupons, QR codes, movie trailers, and/or a host of targeted information generally viewed by the particular recipient to be of value.

It is noted that such electronic content may be targeted and/or customized through any of a host of techniques, including but not limited to any of those discussed hereinabove. Therefore, a user's browsing history, purchasing history, expressed interests, and/or specific requests may be tracked through a variety of existing approaches and/or through approaches that are developed in the future. With this and other similar information, a user profile may be developed indicating those advertising topics of particular interest to the particular user. Additional information that may assist in such profiling might include zip code, geocode and/or other data available regarding values, attitudes, interests, and/or lifestyle.

In addition, targeting and/or customization of an electronic advertising message may be made contextual for the particular recipient. For example, time of delivery, frequency of delivery, and/or location of the recipient at the time of delivery may all be employed as parameters to focus and/or tailor the content to be delivered. This may also be in addition to information independent of context, such as a user's session-independent, cross-network, and/or content-specific preferences.

Content may be selected and/or targeted at least in part based on particular request for information. Likewise, it may be possible for a recipient to designate the content to be delivered in conjunction with an OTP. As one example, an "opt-in" mechanism may be employed, where a recipient may be invited to sign up for promotional information about one and/or more categories of products and/or services. Thus, a user may indicate a desire to receive electronic advertising content related to particular topics, services, and/or products of interest. In addition, such a mechanism may take various forms. For example, a user may request that advertising be sent from a particular advertiser and/or category. As another example, a user and/or recipient may designate categories of advertising and/or categories of information of interest. Likewise, a single "opt-in" mechanism and/or a double "opt-in" mechanism may be used. For example, a user may simply designate the desire to receive particular advertising content, and an attempt may be made to have the user verify the designation after it has been made.

Similarly, users may be enticed to opting-in to receive particular advertising content. For example, an "opt-in" may result in entry into a sweepstakes and/or contest, a discount, a product or service enhancement, and other possibilities. Likewise, users "opt-in" to provide additional information regarding desired and/or selected advertising content that is of interest to the particular user. Furthermore, a user and/or recipient may be enticed by being offered other types of content to be received with an OTP in conjunction with but not limited to advertising content, such as sports information, world news, and/or up-to-the minute business information, etc.

It is also possible to provide an "opt-out" mechanism. As possible examples, "opt-out" may be accomplished by a user clicking on a hyperlink to unsubscribe or by sending or replying to an electronic message with the word "unsubscribe" in the subject line.

Figure 2:
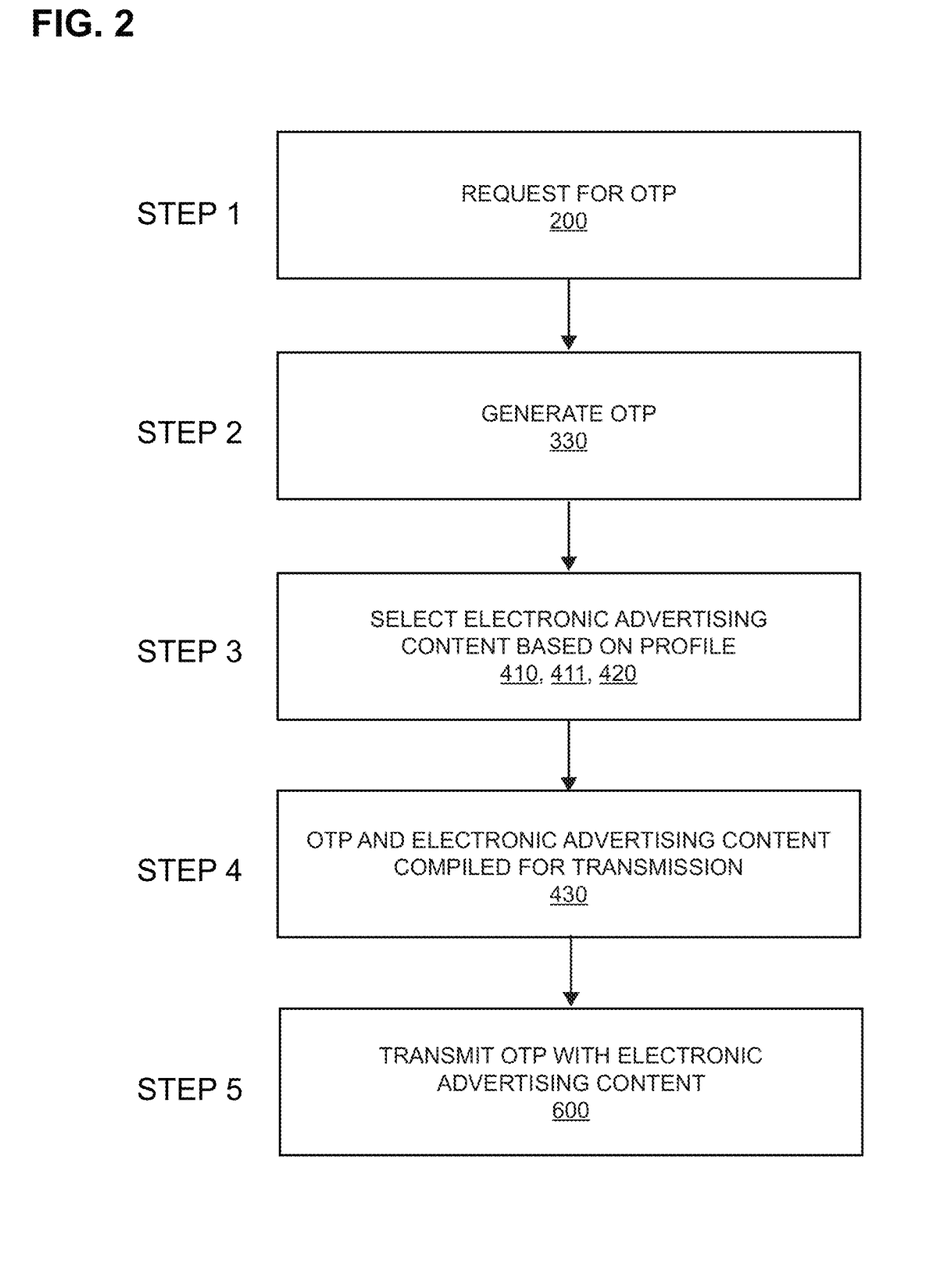
FIG. 2 is a flow diagram illustrating an embodiment of a method for an authentication advertising system for electronic advertising content according to the present invention.

FIG. 2 is a flow diagram illustrating one non-limiting example of a process for targeted and/or customized electronic advertising content in accordance with the present invention. In the first step, an OTP request is made by a user from a desired and/or selected limited access system 200 and/or personal communication device 700. In one embodiment, the request for an OTP is usually directed to the authentication server 300 via the desired and/or selected limited access system 200. In another embodiment, such a request may be transmitted using SMS messaging via personal communication device 700. In step two, the requested OTP is generated by the password generator 330 based on validating the user identity as described hereinabove from the authentication server 300. In step three, the profiling engine 410 may request that a selection of a targeted and/or customized advertising content based on a user profile from profiling data base 411 and ad server 420, so that this targeted and/or customized electronic advertising content may be delivered in conjunction with an OTP to personal communication device 700 while at the same time electronic advertising content is delivered to OTP status notification transition screen(s) 210. In step 4, the profiling engine 410 selects and/or generates targeted and/or customized advertising content based on the techniques and principles described above, and the selected electronic advertising message is bundled together with the OTP by the "OTP and ad compiler 430" block in FIG. 1. In step 5, the electronic advertising content is delivered from the communication module 600 to the limited access system 200 via an OTP status notification transition screen(s) 210 and to the personal communication device 700 along with the OTP.

As previously described, in addition to an electronic advertising content, other information and/or content may be delivered. For example, in addition to and/or instead of an electronic advertising content, other information to be delivered may include but not limited to airline boarding passes, admission tickets for events, and/or time sensitive information (e.g., breaking news, local weather reports, security alerts, and the like).

FIGS. 4A-4D are schematic diagrams illustrating examples of a personal communication device 700 that has received electronic messages in various formats that include an OTP together with an electronic advertising message that has been targeted and/or customized to the individual and/or entity account for that particular personal communication device 700. Depending at least in part upon the particular embodiment or situation, the electronic advertising content may be passive and/or active. For example, in one embodiment, the electronic advertising content delivered in conjunction with an OTP may involve no active user participation other than focusing for a moment on the message. However, in other embodiments, the electronic advertising content may be Interactive and/or interact in some manner with the recipient. Examples include, without limitation, rotating banner ads, reply back ads, full-motion video clips, audio clips, click-to-call hyperlinks, website links, and website redirects. The example of FIG. 4B includes a hyperlink to an advertiser's website in the electronic advertising message along with the OTP. FIG. 4A is an SMS example that includes along with the OTP a "reply back" advertising in the electronic advertising message.

Figure 3:
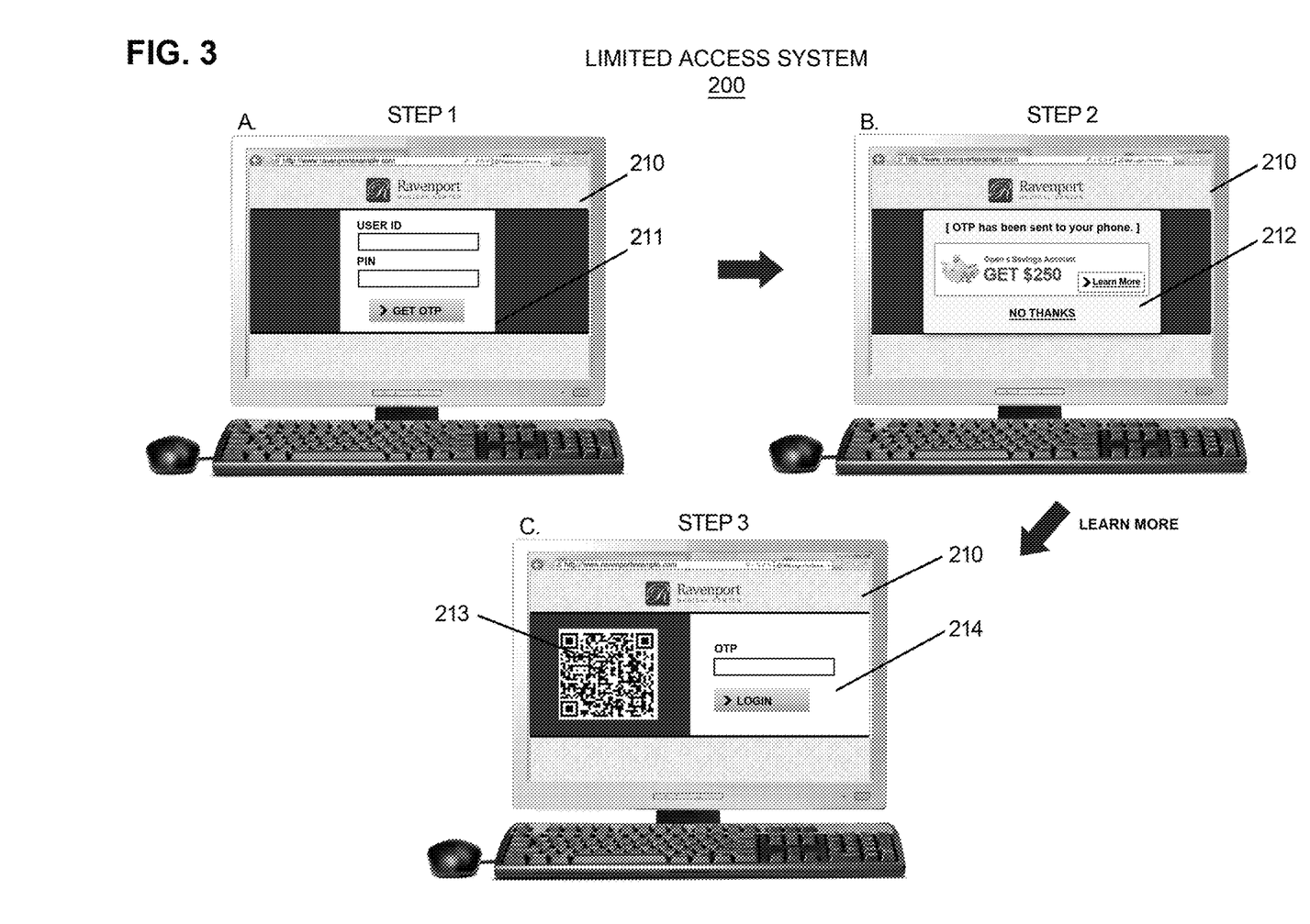
FIGS. 3A-3C illustrates the operation of the flow diagram of FIG. 2 according to one non-limiting embodiment of the present invention.

In addition, FIGS. 5A-5C illustrates the example of an embodiment of the operation process shown in FIGS. 3A-3C. In Step 1 of FIG. 3A, an OTP request is made by a user from a desired and/or selected limited access system 200. This is shown in FIG. 3A with a request box 211, where a message such as "Get OTP" can be displayed on the limited access system 200. The user can input a username, a PIN, passcode and/or password to request an OTP. Initiating an OTP request will trigger the display of the OTP status notification transition screen(s) 210 in the limited access system 200 as shown in FIG. 3B (step 2). In FIG. 3B (step 2), an advertising space 212 can be displayed on the OTP status notification transition screen(s) 210 on which the user can click the link for the ad in the advertising space 211 to view the ad in various formats and/or even can be viewed as a separate session. The advertising space on the OTP status notification transition screen(s) 210 can be used to display form fields, banner ads, widgets, text, images, hyperlinks, video and/or any combination thereof. The advertising can also be third-party sponsored advertising such as "GOOGLE ADSENSE™". The request for an OTP is usually directed to the authentication server 300 via the desired and/or selected limited access system 200. In one embodiment, such a request may be transmitted using SMS messaging.

In FIG. 3B (step 2), the requested OTP is generated by the password generator 330 based on validating the user's credentials as described hereinabove from authentication server 300. In FIG. 3A (step 1), the profiling engine 410 may request that a targeted and/or customized advertising content be selected, so that the electronic advertising message 212 may be delivered to the OTP status notification transition screen(s) 210 as displayed in FIG. 3B. The display of the OTP status notification transition screen(s) 210 can be viewed but is not limited to an entire Hyper Text Markup Language (HTML) page, landing page with form fields, hyperlinks, images, video, banner, QR codes, social media feeds, tickers, pop-up, pop-over, pop-over, new tab, and/or new window session, etc. When the user clicks on the "Learn More" button and/or link, the electronic advertising message can be viewed but is not limited to banner ads, floating ads, expanding ads, wallpaper ads, pop-up, pop-under, roll-over, audio ads, QR codes, video ads, map ads, hyperlinks, social media feeds, new tab, new window session, live tickers and/or feeds, and/or widgets, and all other means of displaying electronic advertising content that may be supported and/or developed in the future.

Figure 4:
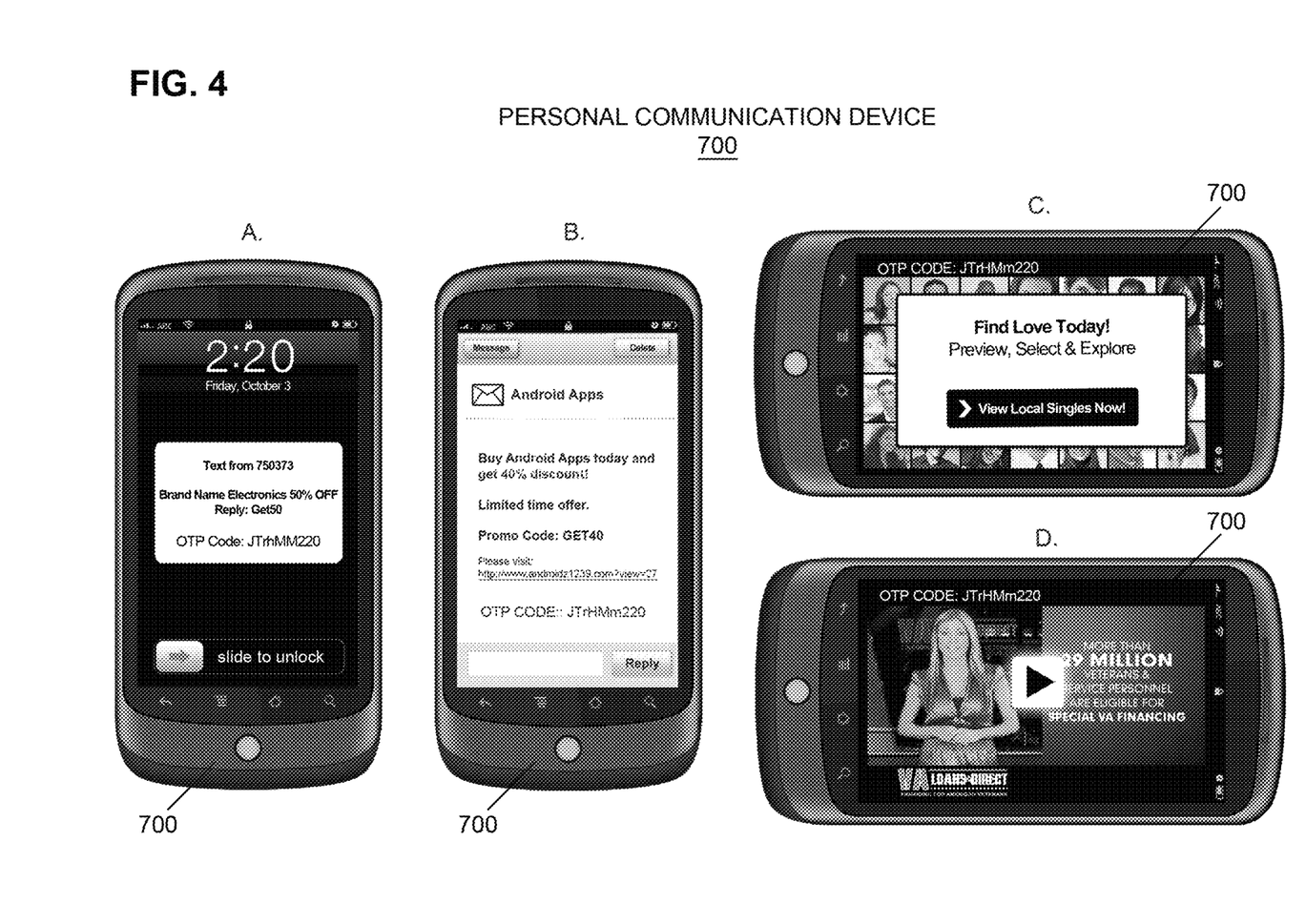
FIGS. 4A-4D illustrates examples of embodiments of an authentication advertising system for electronic advertising content according to the present invention.
Figure 5:
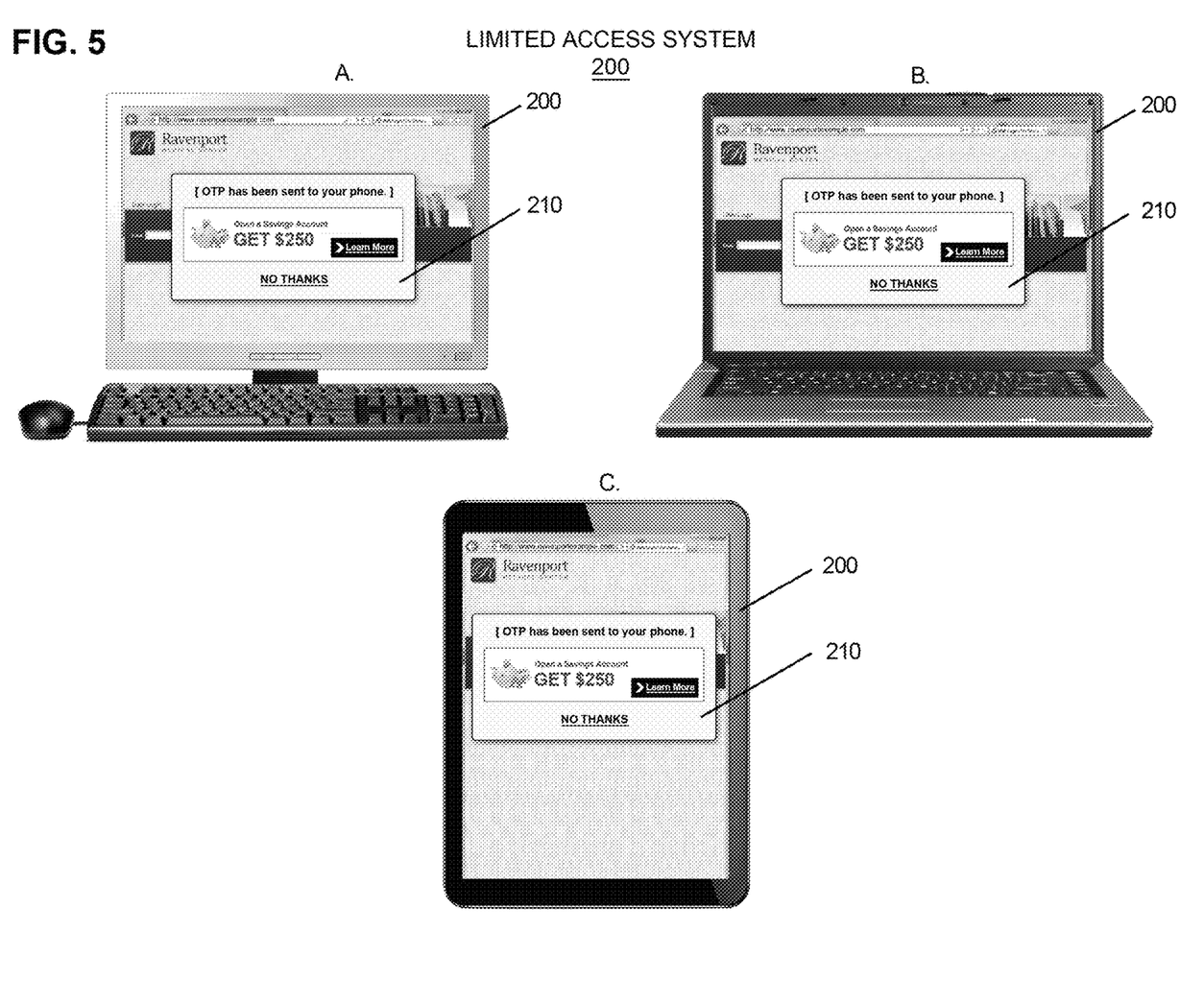
FIGS. 5A-5C are examples of embodiments of an authentication advertising system for electronic advertising content according to the present invention.

At the same time, the profiling engine 410 may request that a different and/or same targeted and/or customized electronic advertising message be selected and/or compiled by OTP and ad compiler 430, so that the electronic advertising content may be bundled together with the OTP and delivered to personal communication device 700. The electronic advertising content is delivered from the communication module 600 to the personal communication device 700 along with the OTP as shown in FIG. 4. FIG. 4 illustrates the example of an embodiment of the operation process, where the screen of the personal communication device 700 displays the OTP together with a targeted and/or customized electronic advertisement message. The delivery can be accomplished through any wireless and/or cellular protocol, including but not limited to email, push notification, SMS messages, MMS messages and/or TCP/IP. The advertising space of personal communication device 700 can be used to display banners, widgets, texts, images, hyperlinks, video and/or any combination thereof as shown in FIG. 4. As an alternative to FIG. 4, the OTP and electronic targeted message may also be sent by voice through a landline, data line, VOIP (voice over Internet protocol) and/or cellular protocol.

Next, the user can enter the OTP received via personal communication device 700 into a login, screen of limited access system 200 to access the desired and/or selected site, application and/or program. Referring to FIG. 3C (step 3), OTP status notification transition screen(s) 210 displays a login box 214 where the user can input the OTP received via personal communication device 700 to gain access. The login box 214 can be accompanied by an electronic advertising content 213 as shown in FIG. 3C. The electronic advertising content can be viewed but is not limited to banner ads, floating ads, expanding ads, wallpaper ads, pop-up, pop-under, roll-over, audio ads, QR codes, video ads, map ads, hyperlinks, social media feeds, new tab, new window session, live tickers and/or feeds, and/or widgets, and all other means of displaying electronic advertising content that may be supported and/or developed in the future. Users can also make requests to have additional information sent to them in various different formats and/or at a later time. In one example, the user makes a request to have the information and/or additional information sent to the user's personal communication device 700.

As previously described, in addition to electronic advertising content, other information and/or content may be delivered. For example, in addition to and/or instead of an electronic advertising message, other information to be delivered may include airline boarding passes, admission tickets for events, and/or time sensitive information (e.g., breaking news, local weather reports, security alerts, and the like).

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method for delivering at least three targeted interactive electronic messages to an electronic personal communication device comprising a display screen based on an initial request for a personalized password, comprising:

associating, by an authentication advertising server, a user profile stored in a profiling database with the electronic personal communication device, wherein the profiling database contains information tracked by at least a plurality third-parties;

receiving, by the authentication advertising server, the initial request for the personalized password through a limited access system, the personalized password enabling access to an application server by the limited access system;

cross referencing, by the authentication advertising server, the information tracked by the plurality third-parties;

displaying a first targeted interactive electronic message of at least one of the three targeted interactive electronic messages by the authentication advertising server on a one-time password (OTP) status notification transition screen of the limited access system, wherein the first targeted interactive electronic message being an active type and requiring a secondary action;

selecting, by the authentication advertising server, a second targeted interactive electronic message of at least one of the three targeted interactive electronic messages as a second targeted interactive electronic message by the authentication advertising server based on the cross referencing, wherein the second targeted interactive electronic message being the active type and requiring another secondary action from the electronic personal communication device;

bundling, by an OTP-advertisement compiler of the authentication advertising server, the selected interactive electronic message and an OTP, wherein the OTP being provided as the personalized password, and wherein the bundled targeted interactive electronic message further comprises a promotional code that is valid for a predetermined time transmitting, by the authentication advertising server and to the electronic personal communication device, the bundled targeted interactive electronic message that comprises the selected targeted interactive electronic message with the OTP;

displaying a third targeted interactive electronic message of at least one of three targeted interactive electronic messages by the authentication advertising server on an OTP login screen of the limited access system, wherein the third targeted interactive electronic message being the active type and requiring a third secondary action;

authenticating the OTP transmitted to the electronic personal communication device through the OTP login screen by the authentication advertising server; and deactivating the OTP after the predetermined time by the limited access system, wherein the deactivated OTP cannot be used to access the application server through the limited access system.

2. The method of claim 1, further comprising maintaining in the profiling database at least one of gender, age, geographic region of interest, industry, frequency of access, time of access, location at time of access, previous electronic purchases, payment information, and Web browsing habits.

3. The method of claim 1, further comprising maintaining metrics based on the secondary action.

4. The method of claim 3, further comprising updating the profiling database with the metrics for the corresponding user profile.

5. The method of claim 3, wherein said maintaining metrics further comprises determining at least one of a consumer response rate, a clickthrough rate (CTR), a view rate, and a pay per reply statistic.

6. The method of claim 1, wherein at least one of the secondary action, the another secondary action, and the third secondary action is selected from a group consisting of requesting to learn more; requesting to view now; requesting to opt-in; requesting to opt-out; requesting a coupon; requesting an appointment; requesting a quick response (QR) code; requesting to play audio/video content; requesting additional information; requesting to be contacted; filling out a form field application; calling a phone number; clicking to call; clicking on a hyperlink; replying by short message service (SMS); replying by multimedia messaging service (MMS); replying by electronic chat; and declining an offer.

7. The method of claim 1, wherein said transmitting the bundled targeted interactive electronic message with the OTP comprises delivery of the bundled targeted interactive electronic message with the OTP to the electronic personal communication device through at least one of electronic mail (e-mail), push notification, short message service (SMS), multimedia messaging service (MS), and Transmission Control Protocol/Internet Protocol (TCP/IP) communication.

8. A method for delivering at least one targeted interactive electronic message to an electronic personal communication device comprising a display screen based on an initial request for a personalized password, comprising:

associating, by an authentication advertising server, a user profile stored in a profiling database with the electronic personal communication device, wherein the profiling database contains information tracked by at least a plurality third parties;

receiving, by the authentication advertising server, the initial request for the personalized password through a limited access system, the personalized password enabling access to an application server by the limited access system;

cross referencing, by the authentication advertising server, the information tracked by the plurality third-parties;

displaying, by the limited access system, a first targeted interactive electronic message by the authentication advertising server on a one-time password (OTP) status notification transition screen of the limited access system, wherein the first targeted interactive electronic message being an active type and requiring a secondary action;

bundling, by an OTP-advertisement compiler of the authentication advertising server, a selected interactive electronic message and an OTP as a second targeted interactive electronic message;

wherein the OTP being provided as the personalized password;

wherein the selected interactive electronic message is selected based on the cross referencing;

wherein the second targeted interactive electronic message being the active type and requiring another secondary action from the electronic personal communication device;

transmitting, by the authentication advertising server and to the electronic personal communication device, the second targeted interactive electronic message;

displaying, by the display screen of the electronic personal communication device, the second targeted interactive electronic message comprising the OTP and a promotional code that is valid for a predetermined time;

displaying a third targeted interactive electronic message by the authentication advertising server on an OTP login screen of the limited access system, wherein the third targeted interactive electronic message being the active type and requiring a third secondary action;

authenticating the OTP displayed on the electronic personal communication device through the OTP login screen by the authentication advertising server; and deactivating the OTP after the predetermined time by the limited access system, wherein the deactivated OTP cannot be used to access the application server through the limited access system.

9. The method of claim 8, further comprising maintaining in the profiling database at least one of gender, age, geographic region of interest, industry, frequency of access, time of access, location at time of access, previous electronic purchases, payment information, and Web browsing habits.

10. The method of claim 8, further comprising maintaining metrics based on the secondary action.

11. The method of claim 10, wherein said maintaining metrics further comprises determining at least one of a consumer response rate, a clickthrough rate (CTR), a view rate, and a pay per reply statistic.

12. The method of claim 8, wherein at least one of the secondary action and the another secondary action is selected from a group consisting of: requesting to learn more; requesting to view now; requesting to opt-in; requesting to opt-out; requesting a coupon; requesting an appointment; requesting a quick response (QR) code; requesting to play audio/video content; requesting additional information: requesting to be contacted; filling out a form field application; calling a phone number; clicking to call; clicking on a hyperlink; replying by short message service (SMS); replying by multimedia messaging service (MS); replying by electronic chat; and declining an offer.

13. The method of claim 8, wherein said transmitting the second targeted interactive electronic message with the OTP comprises delivery of the second targeted interactive electronic message with the OTP to the electronic personal communication device on the screen through at least one of electronic mail (e-mail), push notification, short message service (SMS), multimedia messaging service (MS), and Transmission Control Protocol/Internet Protocol (TCP/IP) communication.

* * * * *